US012794874B2

(12) United States Patent
Neumann et al.

(10) Patent No.: US 12,794,874 B2
(45) Date of Patent: Nov. 10, 2026

(54) SECURE CUSTOMER-MANAGED CERTIFICATE AUTHORITY INTEGRATION

(71) Applicant: SAP SE, Walldorf (DE)

(72) Inventors: Nils Neumann, Leimen (DE); Marc Rahn, Mannheim (DE)

(73) Assignee: SAP SE, Walldorf (DE)

( * ) Notice: Subject to any disclaimer, the term of this patent is extended or adjusted under 35 U.S.C. 154(b) by 57 days.

(21) Appl. No.: 18/935,990

(22) Filed: Nov. 6, 2024

(65) Prior Publication Data

US 2026/0129036 A1 May 7, 2026

(51) Int. Cl.
*H04L 9/40* (2022.01)

(52) U.S. Cl.
CPC ...... *H04L 63/0823* (2013.01); *H04L 63/0815* (2013.01); *H04L 63/108* (2013.01)

(58) Field of Classification Search
CPC H04L 63/0823; H04L 63/0815; H04L 63/108
See application file for complete search history.

(56) References Cited

U.S. PATENT DOCUMENTS 11,451,537 B2 9/2022 Eberlein
12,355,746 B1 * 7/2025 Prateek ............... H04L 63/0807
2018/0101418 A1 * 4/2018 Zhao ......................... G06F 9/54
2018/0316657 A1 * 11/2018 Hardt ...................... H04L 63/08
2019/0103968 A1 * 4/2019 Srinivasan ............ H04L 9/0894
2020/0228337 A1 * 7/2020 Sumien ............... H04W 12/069
2023/0195932 A1 * 6/2023 Carnesecca ......... G06F 21/6245 726/26
2025/0202882 A1 * 6/2025 Griffin-Allwood .......................... H04L 63/0435

* cited by examiner

*Primary Examiner* — Vance M Little
(74) *Attorney, Agent, or Firm* — Buckley, Maschoff & Talwalkar LLC

(57) ABSTRACT

A system associated with an application access framework in a cloud computing environment may include a secure login server that authenticates, via a secure login service, a customer user requesting access to a cloud application. The secure login service may then obtain a user access token via an identity authentication protocol client at a customer cloud-based identity authentication service tenant. It is arranged for the user access token to be exchanged for an exchanged access token. The exchanged access token can then be provided from the secure login service to a cloud service identity provider of the customer to gain temporary access. The secure login service uses the temporary access to have a customer Public Key Infrastructure ("PKI") certificate authority in the cloud service issue an authentication certificate for the customer user.

16 Claims, 10 Drawing Sheets

800

| EMPLOYEE REQUEST IDENTIFIER 802 | CUSTOMER IDENTIFIER 804 | EMPLOYEE ACCESS TOKEN 806 | EXCHANGED ACCESS TOKEN 808 | ROLES AND POLICIES 810 | CERTIFICATE 812 |
|---|---|---|---|---|---|
| R_101 | C_101 | | | | |
| R_102 | C_101 | | | | |
| R_103 | C_101 | | | | |
| R_104 | C_102 | | | | |

*FIG. 8*

SECURE CUSTOMER-MANAGED CERTIFICATE AUTHORITY INTEGRATION

BACKGROUND

A provider may let a customer enterprise access business applications in a cloud computing environment. For example, a customer employee may access an Advanced Business Application Programming ("ABAP") business application. Such an arrangement may utilize a Public Key Infrastructure ("PKI") to create, manage, distribute, use, and store digital certificates and manage public-key encryption. The PKI may facilitate the secure electronic transfer of information for a range of network activities such as e-commerce, internet banking, and other confidential communications. The PKI binds public keys with respective identities of entities through a process of certificate registration and issuance by a Certificate Authority ("CA"). The X.509 protocol is an International Telecommunication Union ("ITU") standard defining the format of public key certificates, such as those used in the Transport Layer Security (TLS"), Secure Socket Layer ("SSL"), and Hyper-Text Transfer Protocol-Secure ("HTTPS") for browsing the web.

To facilitate access, the provider may establish a secure log-in service that lets customer employees access business application with a Single Sign-On ("SSO") authentication scheme. SSO may let a user log in with a single identifier to several related, yet independent, software systems. For example, the customer employee may log in once (e.g., with a username and password) and access services without needing to re-enter authentication factors.

FIG. 1 is a traditional system 100 in which a customer employee 110 logs in via a provider 130 to access ABAP-based business applications. The customer employee uses a secure login service 120 that communicates with a cloud PKI 130 to issue a X.509 client certificate. These X.509 client certificates are issued within the cloud PKI 135 which is operated solely by the provider 130. For compliance reasons, customers may not want to use a provider 130 managed cloud PKI 135 to sign the X.509 client certificates. Instead, the customer may prefer to integrate a Certificate Authority ("CA") and PKI that is fully under their control. That is, customers may want to maintain full control of their PKI while retaining the easy integration and capabilities provided by the secure login service 120. They might also not want to give the provider 130 permanent and complete access to a PKI (e.g., via shared and fixed credentials). Instead, the customer may prefer to share only temporary and restricted access with the secure login service 120 to issue X.509 client certificates on behalf of their employees.

It would therefore be desirable to provide customer-managed CA integration in a secure, automatic, and efficient manner.

SUMMARY

According to some embodiments, methods and systems associated with an application access framework in a cloud computing environment may include a secure login server that authenticates, via a secure login service, a customer user requesting access to a cloud application. The secure login service may then obtain a user access token via an identity authentication protocol client at a customer cloud-based identity authentication service tenant. It is arranged for the user access token to be exchanged for an exchanged access token. The exchanged access token can then be provided from the secure login service to a cloud service identity provider of the customer to gain temporary access. The secure login service uses the temporary access to have a customer PKI certificate authority in the cloud service issue an authentication certificate for the customer user.

Some embodiments comprise: means for authenticating, by a computer processor of a secure login server via a secure login service, a customer user requesting access to a cloud application; means for obtaining, by the secure login service, a user access token via an Open Identifier Connect ("OIDC") client at a customer cloud-based identity authentication service tenant; means for arranging for the user access token to be exchanged for an exchanged access token; means for providing the exchanged access token from the secure login service to a cloud service identity provider of the customer to gain temporary access; means for using, by the secure login service, the temporary access to have a customer PKI certificate authority in the cloud service issue a X.509 public key certificate for the customer user; and means for using the X.509 public key certificate to provide the customer user with access to the cloud application.

Some technical advantages of some embodiments disclosed herein are improved systems and methods to provide customer-managed CA integration in a secure, automatic, and efficient manner.

BRIEF DESCRIPTION OF THE DRAWINGS

FIG. 8 is a portion of a certificate integration database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Typically, a secure login system only provides certificates from provider-managed CAs. This limitation meant that customers who required full control over their PKI had to rely on a provider-managed infrastructure, which might not meet the compliance needs of all customers. Accessing a customer-managed CA is normally done using static credentials. Solutions using static credentials require securely storing and rotating these credentials, which introduces substantial security risks. If compromised, static credentials can lead to unauthorized access and potential misuse. Moreover, direct integration methods often necessitate extensive configuration and customization, making them complex and time-consuming to implement and maintain. These approaches generally lack the flexibility to accommodate different customer environments and hyperscaler setups, often requiring specific configurations that may not support a wide range of identity providers and CA configurations.

Figure 1:
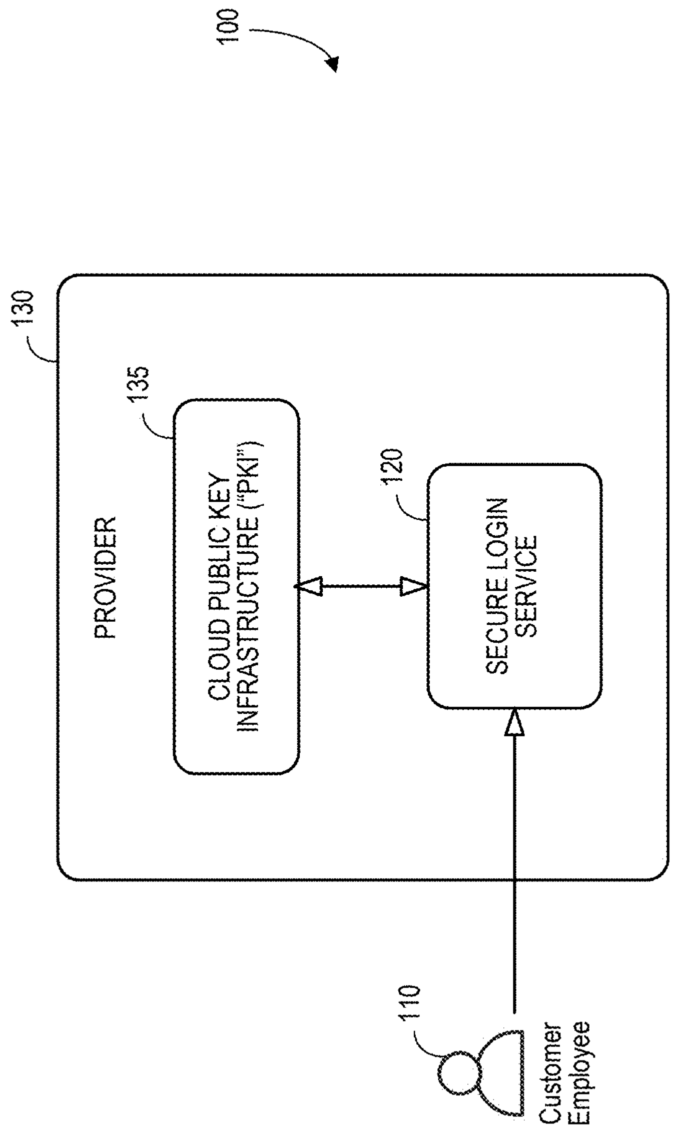
PRIOR ART FIG. 1
FIG. 1 is a traditional business application access system.
Figure 2:
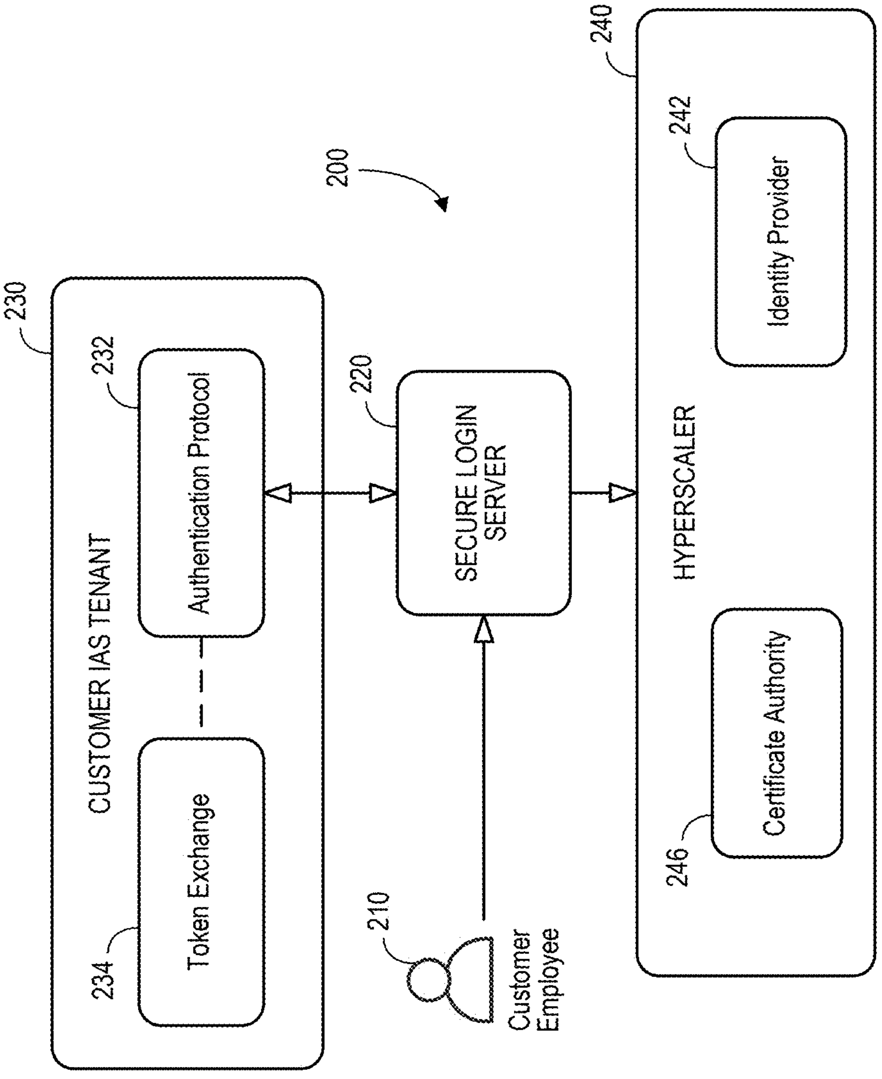
FIG. 2 is a customer-managed CA integration system architecture in accordance with some embodiments.

To address these issues, FIG. 2 is a high-level block diagram of one example of a customer-managed CA integration system 200 architecture according to some embodiments. In particular, a secure login server 220 may interact with a customer employee 210 to let the employee access business applications. In particular, the secure login server 220 may obtain an employee access token from an authentication protocol 232 (that lets users sign in to multiple applications with one set of credentials) executing at a customer tenant 230. The employee access token is then processed by a token exchange 234 to obtain an exchanged access token. The secure login server 220 uses the exchanged access token and an identity provider 242 executing at a hyperscaler 240 to request an authentication certificate from a CA 246. As used herein, the term "hyperscaler" may refer to an environment that provides cloud computing and data management services to customers who require substantial infrastructure to support large-scale data processing and storage.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The secure login server 220 may store information into and/or retrieve information from various data stores (e.g., a certificate data store that could also include a strictly in-memory implementation), which may be locally stored or reside remote from the secure login server 220. Although a single secure login server 220 is shown in FIG. 2, any number of such devices may be included. Moreover, various devices described herein might be combined according to embodiments of the present invention. For example, in some embodiments, a certificate data store and the secure login server 220 might comprise a single apparatus. The system 200 functions may be performed by a constellation of networked apparatuses, such as in a distributed processing or cloud-based architecture. In some cases, the secure login server 220 may process information associated with a number of different customers.

An enterprise may access the system 200 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via a remote device (e.g., to specify roles and policies for a computing environment infrastructure) and/or provide or receive automatically generated recommendations, alerts, summaries, or results associated with the system 200.

Figure 3:
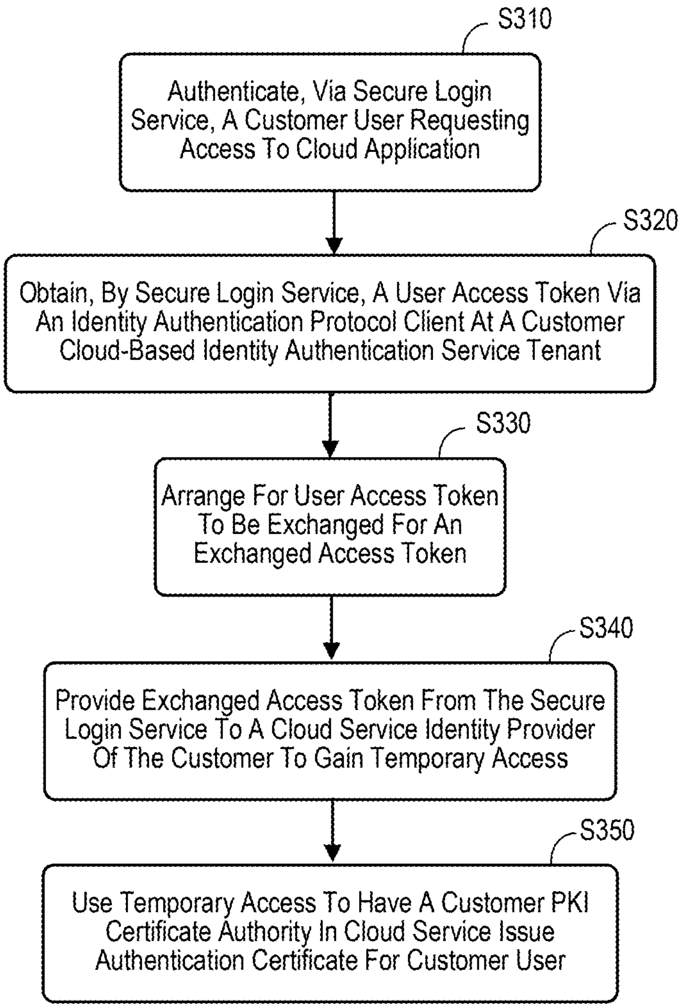
FIG. 3 is a customer-managed CA integration method according to some embodiments.

FIG. 3 is a method that might be performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a computer processor of a secure login server may authenticate a customer user requesting access to a cloud application. For example, the secure login service might authenticate the customer user via Single Sign-On ("SSO"). The cloud application access may be part of an integration suite for data, application, and application Programming Interface ("API") integration. Moreover, the cloud application may comprise an ABAP business application.

At S320, the secure login service obtains a user access token via an identity According to some embodiments, the secure login server is associated with a cloud-based PKI certification service, such as a service that is part of an integration suite for data, application, and application Programming Interface ("API") integration. The identity authentication protocol client at the customer-managed cloud-based identity authentication service tenant may be, for example, an OIDC client. At S330, it is arranged for the user access token to be exchanged for an exchanged access token (e.g., an anonymized exchanged access token).

At S340, the exchanged access token is provided from the secure login service to a cloud service identity provider of the customer to gain temporary access. The temporary access gained by secure login service might, for example, expire after a pre-determined period of time (e.g., five minutes). At S350, the secure login service uses the temporary access to have a customer-managed PKI certificate authority in the cloud service issue an authentication certificate (e.g., an X.509 public key certificate) for the customer user. The authentication certificate can then be used to provide the customer user with access to the cloud application. Moreover, access to the cloud application may be revoked after the customer user accesses the cloud application. According to some embodiments, the cloud service identity provider of the customer communicatees with the customer certificate authority in accordance with customer user roles and policies.

Figure 4:
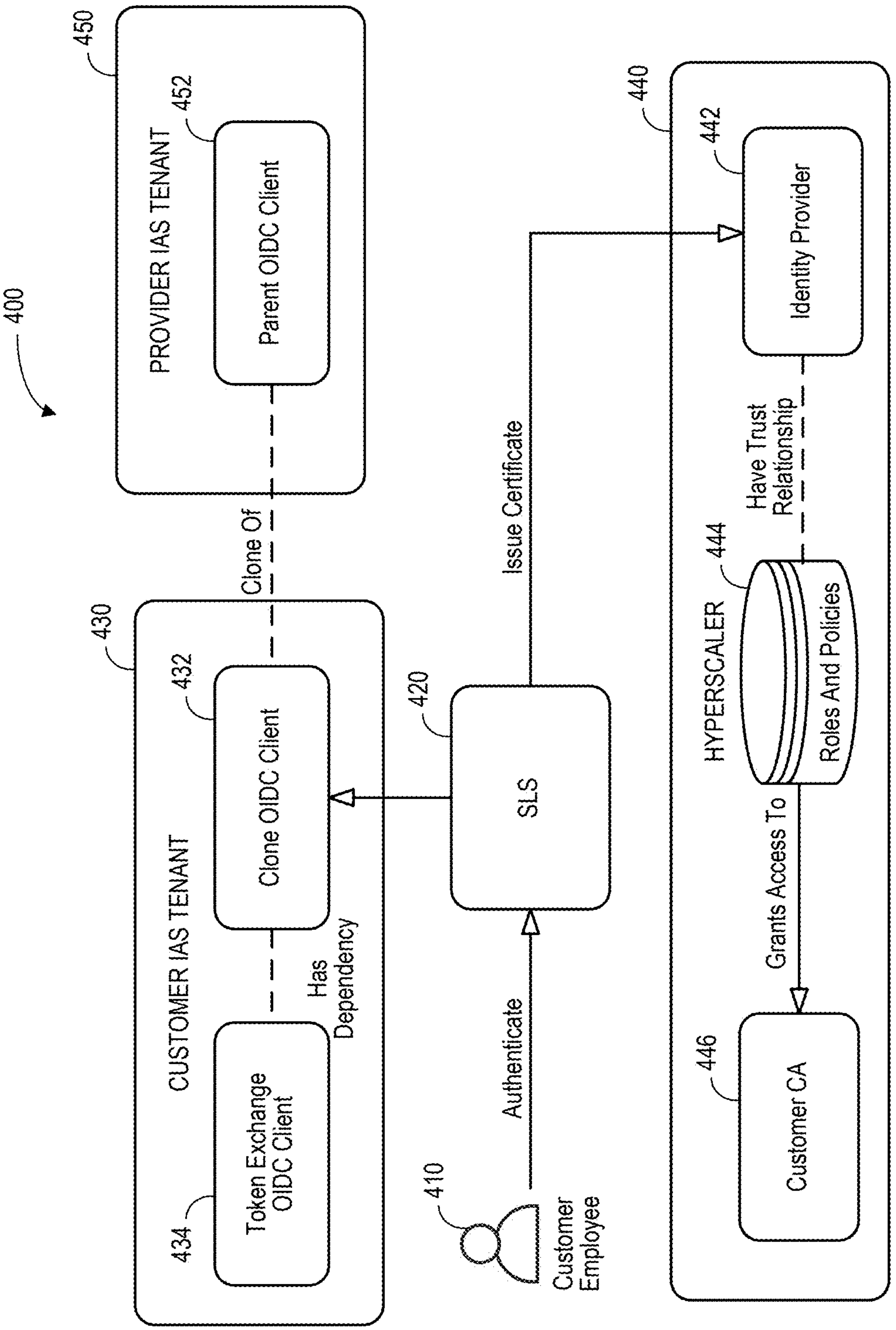
FIG. 4 is a more detailed system in accordance with some embodiments.

Providing static credentials to a secure login service would essentially give it the power to always access the CA and create a need to securely store and rotate these credentials. Instead, embodiments described herein may leverage OIDC to gain temporary access to the CA if, and only if, an authenticated user is accessing the secure login service. For example, FIG. 4 is a more detailed system 400 in accordance with some embodiments. As before, a Secure Login Service ("SLS") 420 may interact with a customer employee 410 to let the employee access business applications. In particular, the secure login server 420 may obtain an employee access token from a clone OIDC client 432 executing at a customer Identity Authentication Service ("IAS") tenant 430. The employee access token is then processed by a token exchange OIDC client 434 to obtain an exchanged access token. The SLS 420 uses the exchanged access token and an identity provider 442 executing at a hyperscaler 440 to request an authentication certificate from a CA 446 in accordance with roles and policies 444. According to some embodiments, the OIDC client 432 is a clone of a parent OIDC client 452 executing at a provider IAS tenant 450 (e.g., that share the same client identifier and access to the parent OIDC client 452 is inherited by clone clients).

For this OIDC flow, a customer needs an identity provider and an OIDC client 432 to authenticate its employees. Fortunately, when a customer uses SLS 420 they may already have an identity provider with an OIDC client 432 in their own IAS tenant 430. When an employee 410 of a customer logs in, the clone OIDC client 432 acting for the identity provider authenticates the employee 410 and issues an access token for this employee 410. With this access token, the employee 410 can access the SLS 420 and generate an X.509 client certificate. Embodiments may reuse the employee's access token, which provides access to the SLS 420, to gain access to the customer CA 446 in the hyperscaler 440 account of the customer. Since a customer might not want the hyperscaler to have the employee's access token (which would let them read employee information from the access token and potentially act maliciously as the employee 410), the employee's access token is exchanged for at the "token exchange" OIDC client 434 running in the customer's IAS tenant 430. This exchanged access token might not grant access to the SLS 420 and may not contain any information about the employee.

This exchanged access token is used to gain access to the customer's CA 446 running in their hyperscaler 440 account. For this, the customer creates an identity provider 442 in their hyperscaler 440 account that accepts access tokens created by the token exchange OIDC client 434, but only if the access tokens originate from the clone OIDC client 432 providing access to the SLS 420. If the access token is accepted, the SLS 420 is provided temporary and restricted access (e.g., restricted via roles and policies 444) to the customer's CA 446 to issue an X.509 client certificate for this employee 410. In the final step, the SLS 420 provides this X.509 client certificate to the employee 410 so they can access their ABAP-based business applications via SSO. After this flow, the access tokens expire and the access is revoked (thus providing only temporary access). Note that embodiments may exchange an employee's Java Script Object Notation ("JSON") Web Token ("JWT") (e.g., a compact URL-safe means of representing claims to be transferred between two parties) and issue a certificate from the hyperscaler CA 446.

In this way, embodiments may integrate a CA and PKI that remains entirely under client supervision. The client upholds full control over their PKI while leveraging the seamless integration and functionalities offered by the SLS and SSO. Rather than granting the SLS permanent and unrestricted access to their PKI through shared and fixed credentials, customers may prefer to provide temporary and limited access. This approach lets the SLS issue X.509 client certificates on behalf of employees.

Figure 5:
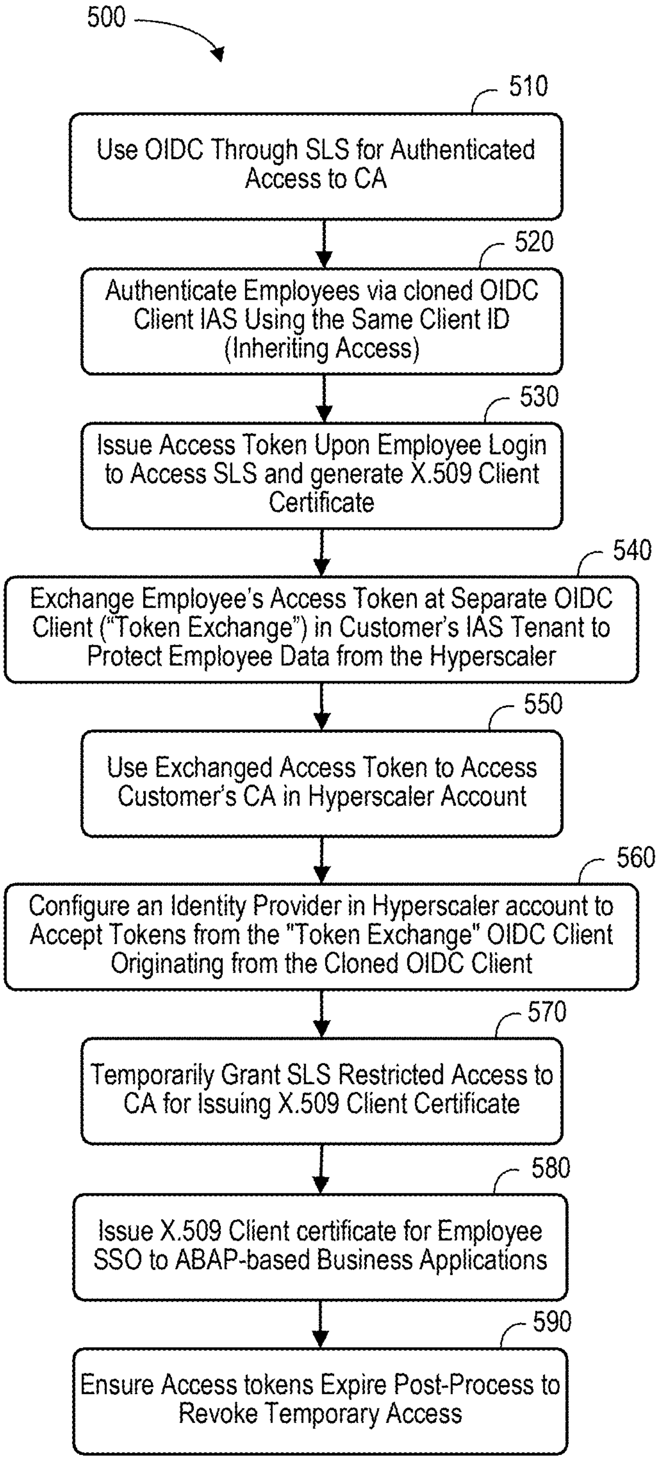
FIG. 5 is a more detailed method according to some embodiments.

FIG. 5 is a more detailed process 500 according to some embodiments. At 510, the system uses OIDC through a SLS for authenticated access to the Certificate Authority (CA). At 520, embodiments may authenticate employees via a cloned OIDC client in IAS using the same client ID. At 530, an access token is issued upon employee login to access SLS and generate an X.509 client certificate. At 540, the employee's access token is exchanged at a separate OIDC client ("token exchange") in the customer's IAS tenant to protect employee data from the hyperscaler. At 550, the system utilizes the exchanged access token to access the customer's CA in their hyperscaler account. At 560, an identity Provider in the hyperscaler account is configured to accept tokens from the "token exchange" OIDC client originating from the cloned OIDC client. At 570, the system temporarily grants the SLS restricted access to the CA for issuing an X.509 client certificate. The X.509 client certificate is issued at 580 for employee SSO to ABAP-based business applications. At 590, the system ensures that access tokens expire post-process to revoke temporary access.

Figure 6:
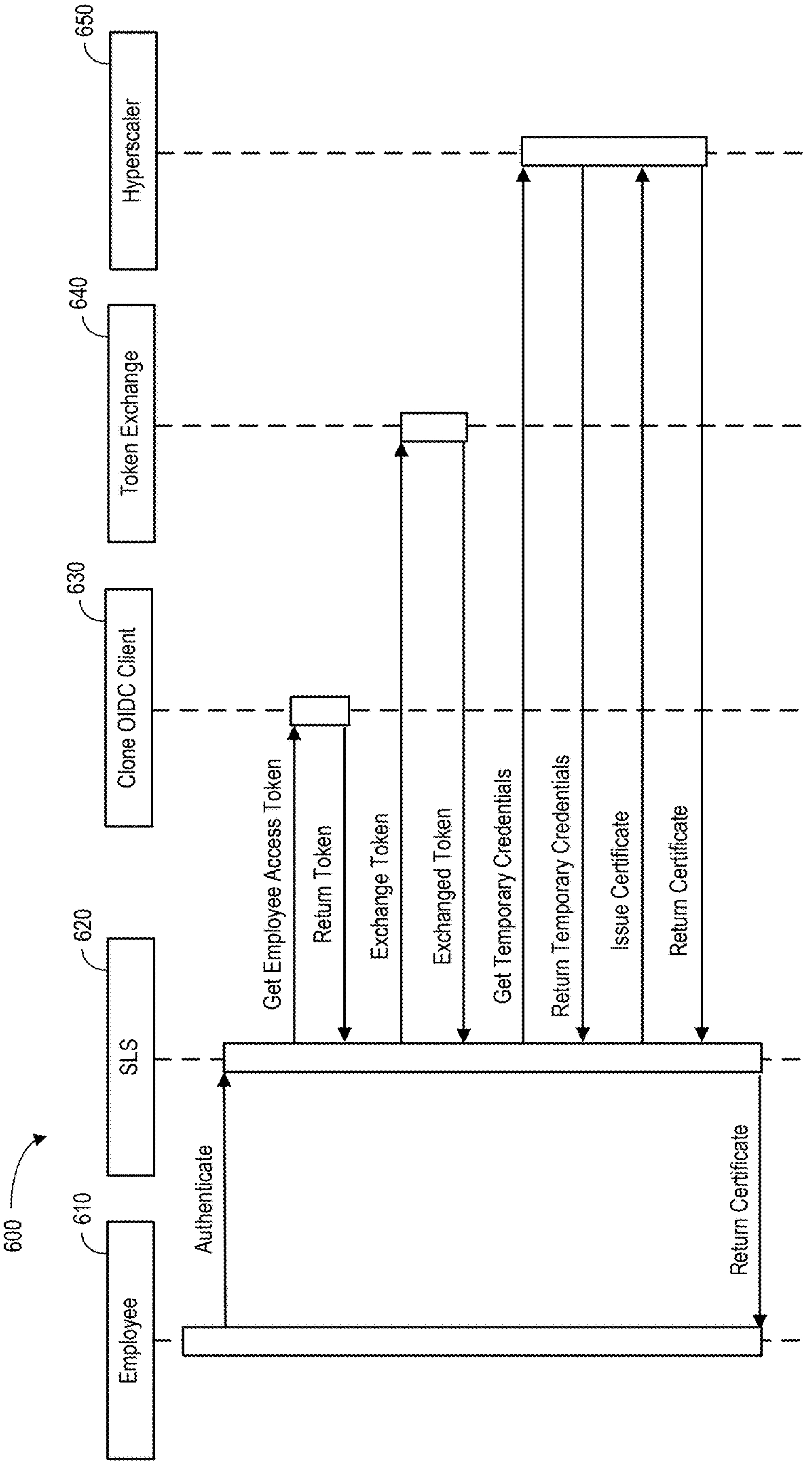
FIG. 6 is an information flow in accordance with some embodiments.

FIG. 6 is an information flow 600 in accordance with some embodiments. Initially, an employee 610 provides authentication to a SLS 620. The SLS 620 requests and receives an employee access token from a clone OIDC client 630. The SLS 620 then requests and receives an exchanged and anonymized token from a token exchange 640. The SLS 620 requests and receives temporary credentials from a hyperscaler 650. Finally, the SLS 620 requests and receives a certificate from the hyperscaler 650 that is then given to the employee 610.

Figure 7:
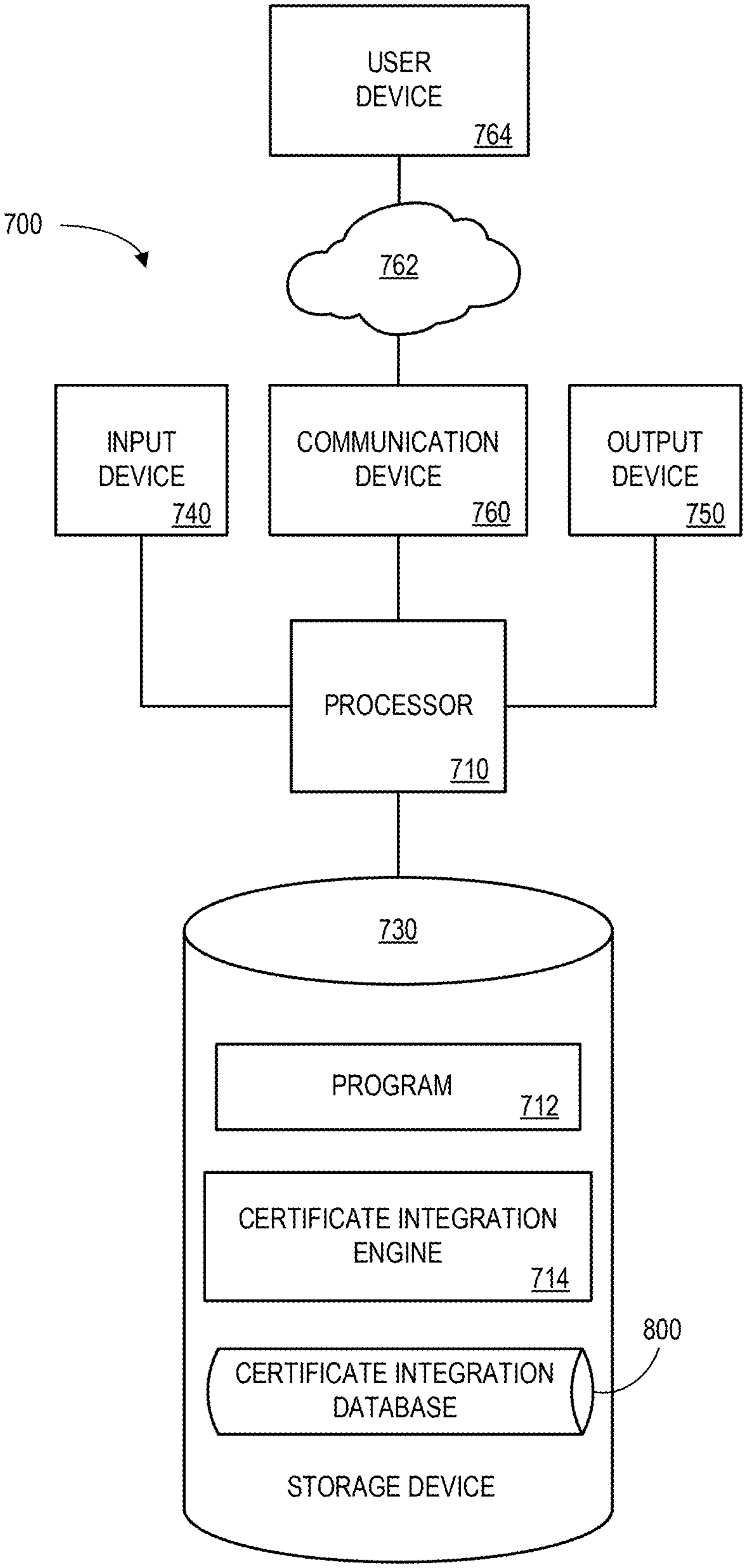
FIG. 7 is an apparatus or platform according to some embodiments.

Note that the embodiments described herein may be implemented using any number of different hardware configurations. For example, FIG. 7 is a block diagram of an apparatus or platform 700 that may be, for example, associated with the system 200 of FIG. 2 (and/or any other system described herein). The platform 700 comprises a processor 710, such as one or more commercially available Central Processing Units ("CPUs") in the form of one-chip microprocessors, coupled to a communication device 760 configured to communicate via a communication network 762. The communication device 760 may be used to communicate, for example, with one or more user devices 764 via a distributed computer network 762. The platform 700 further includes an input device 740 (e.g., a computer mouse and/or keyboard to input data mappings, cloud configurations, etc.) and an output device 750 (e.g., a computer monitor to render a display, transmit recommendations, charts, alerts, and/or reports about a PKI certificate framework or service, etc.).

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or certificate integration engine 714 for controlling the processor 710. The processor 710 performs instructions of the programs 712, 714, and thereby operates in accordance with any of the embodiments described herein. For example, the processor 710 may use a secure login service to authenticate a customer user requesting access to a cloud application. The processor 710 may then obtain a user access token via an identity authentication protocol client at a customer cloud-based identity authentication service tenant. It is arranged by the processor 710 for the user access token to be exchanged for an exchanged access token. The exchanged access token can then be provided to a cloud service identity provider of the customer to gain temporary access. The processor 710 uses the temporary access to have a customer PKI CA in the cloud service issue an authentication certificate for the customer user.

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

In some embodiments (such as the one shown in FIG. 7), the storage device 730 further stores a certificate integration database 800. An example of a database that may be used in connection with the platform 700 will now be described in detail with respect to FIG. 8. Note that the database described herein is only one example, and additional and/or different information may be stored therein. Moreover, various databases might be split or combined in accordance with any of the embodiments described herein.

Referring to FIG. 8, a table is shown that represents the certificate integration database 800 that may be stored at the platform 700 according to some embodiments. The table may include, for example, entries identifying collaborative models on which various users are working. The table may also define fields 802, 804, 806, 808, 810, 812 for each of the entries. The fields 802, 804, 806, 808, 810, 812 may, according to some embodiments, specify: an employee request identifier 802, a customer identifier 804, an employee access token 806, an exchanged access token 808, roles and policies 810, and a certificate 812. The certificate integration database 800 may be created and updated, for example, when a new public key certificate is required.

The employee request identifier 802 might be a unique alphanumeric label that is associated with a request for a PKI public key X.509 certificate from a customer employee. The customer identifier 804 indicates who the employee works for, the employee access token 806 is created by a customer-managed clone OIDC client, and the exchanged access token 808 is received from a customer-managed token exchange OIDC client. The roles and policies 810 may define which employees should receive certificates 812 to access various business applications.

Thus, embodiments may enhance security by leveraging OIDC for temporary access, thereby eliminating the need for static credentials. This approach can significantly reduce the risk of unauthorized access and credential misuse, because temporary access tokens ensure that access is granted only when necessary and for a limited duration. The integration with existing IAS and SLS may be seamless and customers can leverage their existing identity provider and OIDC client setup (which minimizes the need for additional configuration and reduces implementation complexity). Moreover, embodiments may ensure that access to a customer's CA is both temporary and restricted through the use of token exchange mechanisms. This minimizes the scope of access to only what is necessary for issuing X.509 client certificates. The token exchange process may help ensure that employee information is not exposed to the hyperscaler. The exchanged access token used to access the CA might not contain any employee-specific information (protecting employee privacy and preventing potential misuse of personal data). It also prevents the hyperscaler from misusing the token to call the SLS in name of the employee. Finally, embodiments may be designed to be scalable and flexible, accommodating various customer environments and hyperscaler setups. The approach may be adapted to different identity providers and CA configurations (providing a versatile solution for diverse customer needs).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of PKI certificate applications, any of the embodiments described herein could be applied to other types of public key certificate applications.

Figure 9:
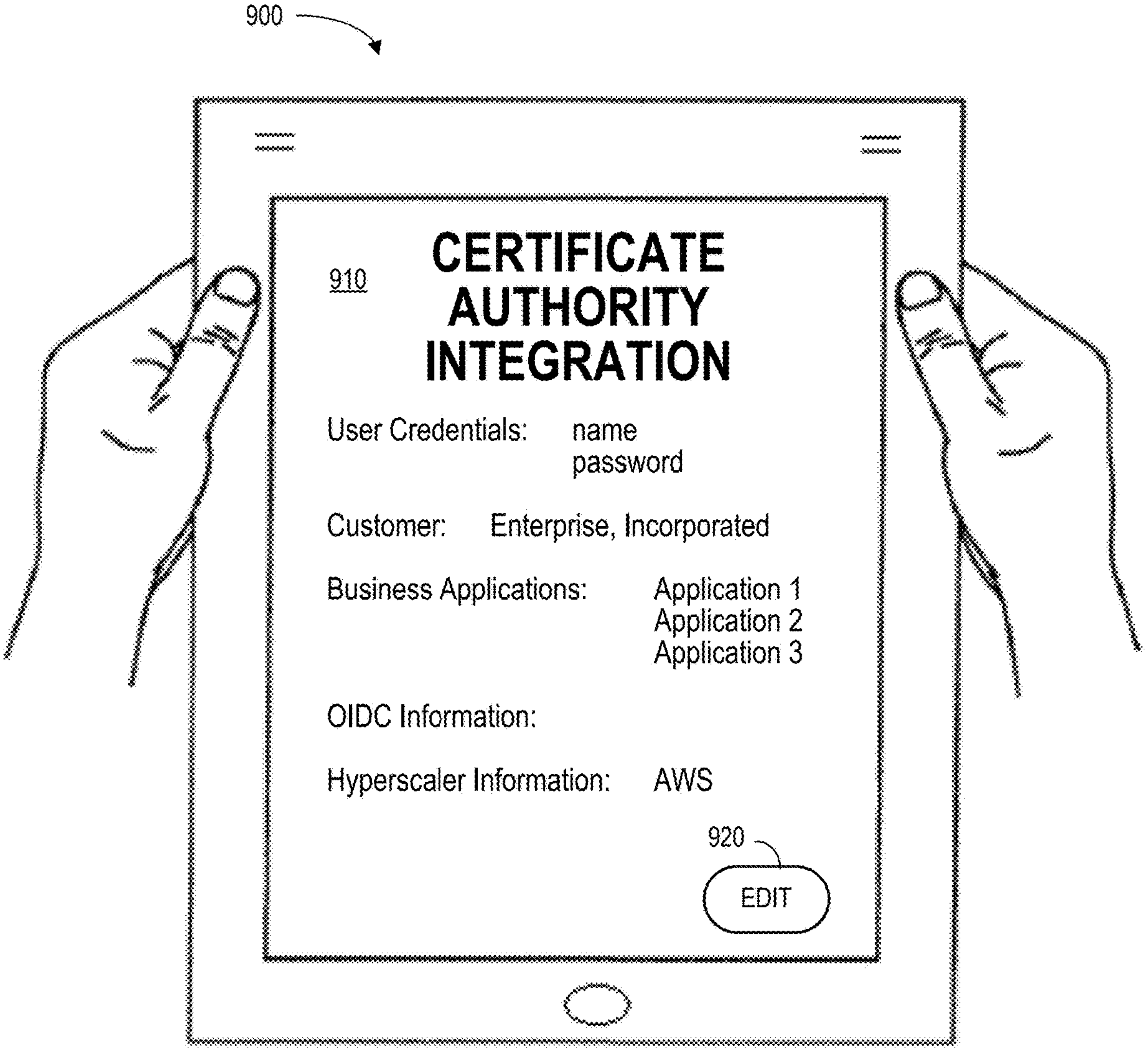
FIG. 9 illustrates a tablet computer customer-managed certificate authority integration display according to some embodiments.

In addition, the displays shown herein are provided only as examples, and any other type of user interface could be implemented. For example, FIG. 9 illustrates a tablet computer 900 providing a customer-managed certificate integration display 910 according to some embodiments. The certificate integration display 910 might be used, for example, to troubleshoot certificate authority integration. A user may interact with the display 910, such as by touching an element of the display 910 and selecting an "Edit" icon 920. In this way, the user may see more information about an element of the configuration setup.

Figure 10:
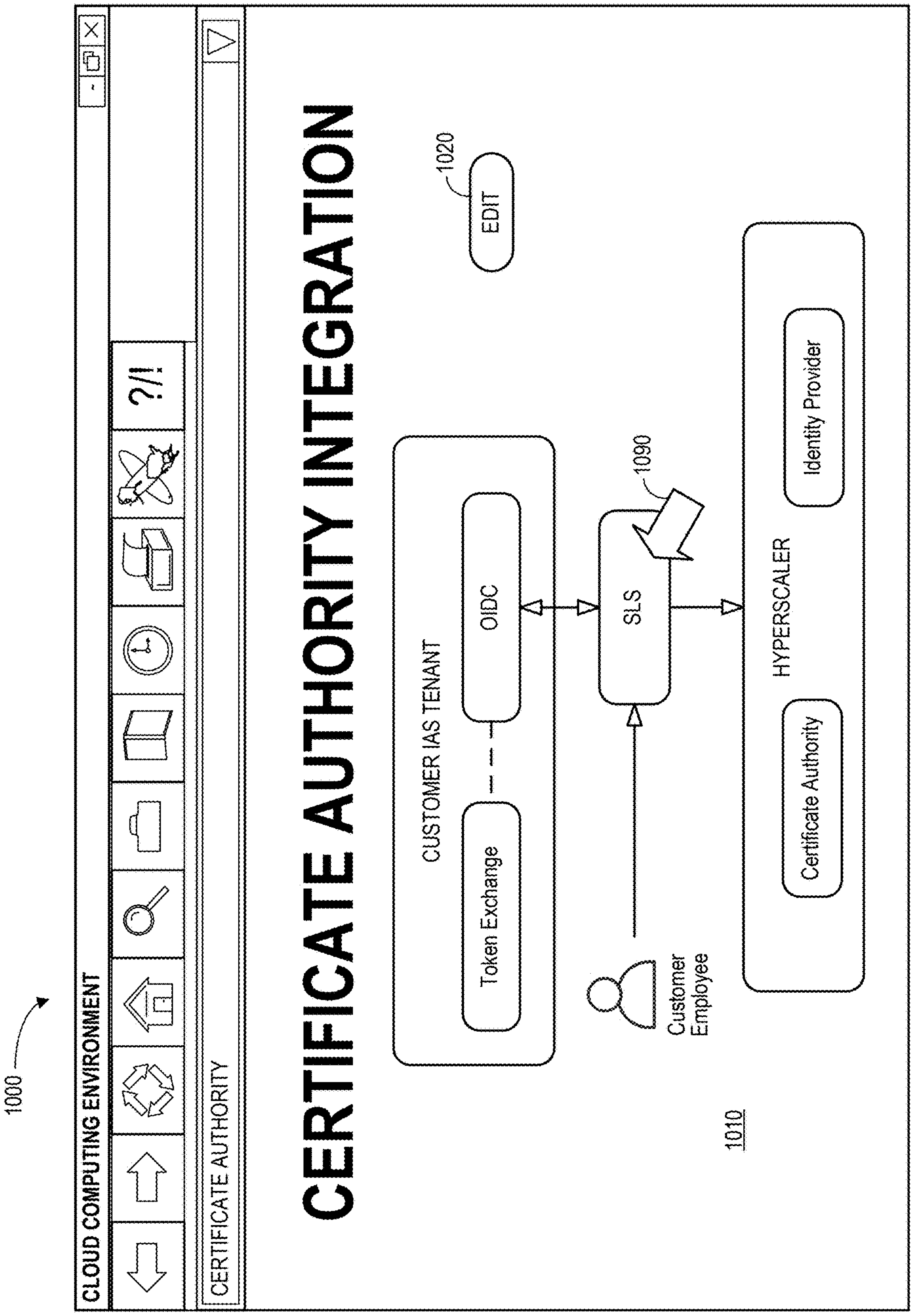
FIG. 10 is a customer-managed certificate authority integration operator or administrator display in accordance with some embodiments.

FIG. 10 is an operator or administrator display 1000 in accordance with some embodiments. The display 1000 includes a graphical representation 1010 of a customer-managed certificate integration system in accordance with any of the embodiments described herein. Selection of an element on the display 1000 (e.g., via a touchscreen or computer pointer 1090) may result in display of a pop-up window containing more detailed information about that element and/or various options (e.g., to define how a certificate authority or SLS interacts with clients or other elements of an integration framework, etc.). Selection of an "Edit" icon 1020 may also let an operator or administrator adjust the operation of the system (e.g., to change mapping to a data store, adjust cloud implementation properties, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with an application access framework in a cloud computing environment, comprising:

a secure login server, including:

a computer processor, and a computer memory storing instructions that, when executed by the computer processor, cause the secure login server to:

authenticate, via a secure login service, a customer user requesting access to a cloud application, obtain, by the secure login service, a user access token via an Open Identifier Connect ("OIDC") client at a customer cloud-based Identity Authentication Service ("IAS") tenant, wherein the OIDC client is a clone of a parent OIDC client, at a provider IAS tenant, and inherits access from the parent OIDC client, arrange for the user access token to be exchanged for an anonymized exchanged access token, provide the anonymized exchanged access token from the secure login service to a cloud service identity provider executing at a hyperscaler of the customer to gain temporary access, and use, by the secure login service, the temporary access to have a customer Public Key Infrastructure ("PKI") certificate authority in the cloud service issue an authentication certificate for the customer user, and after use, revoke the user access token and the anonymized exchanged access token.

2. The system of claim 1, wherein the authentication certificate is used to provide the customer user with access to the cloud application.

3. The system of claim 2, wherein the access to the cloud application is revoked after the customer user accesses the cloud application.

4. The system of claim 1, wherein the secure login service authenticates the customer user via Single Sign-On ("SSO").

5. The system of claim 1, wherein the authentication certificate is an X.509 public key certificate.

6. The system of claim 1, wherein the cloud service identity provider of the customer communicatees with the customer certificate authority in accordance with customer user roles and policies.

7. The system of claim 1, wherein the cloud application access is part of an integration suite for data, application, and application Programming Interface ("API") integration.

8. The system of claim 7, wherein the cloud application comprises an Advanced Business Application Programming ("ABAP") business application.

9. The system of claim 1, wherein the temporary access gained by secure login service expires after a pre-determined period of time.

10. A computer-implemented method associated with an application access framework in a cloud computing environment, comprising:

authenticating, by a computer processor of a secure login server via a secure login service, a customer user requesting access to a cloud application;

obtaining, by the secure login service, a user access token via an Open Identifier Connect ("OIDC") client at a customer cloud-based Identity Authentication Service ("IAS") tenant, wherein the OIDC client is a clone of a parent OIDC client, at a provider IAS tenant, and inherits access from the parent OIDC client;

arranging for the user access token to be exchanged for an anonymized exchanged access token;

providing the anonymized exchanged access token from the secure login service to a cloud service identity provider executing at a hyperscaler of the customer to gain temporary access;

using, by the secure login service, the temporary access to have a customer Public Key Infrastructure ("PKI") certificate authority in the cloud service issue a X.509 public key certificate for the customer user;

using the X.509 public key certificate to provide the customer user with access to the cloud application; and after use, revoking the user access token and the anonymized exchanged access token.

11. The method of claim 10, wherein the access to the cloud application is revoked after the customer user accesses the cloud application and the temporary access gained by secure login service expires after a pre-determined period of time.

12. The method of claim 10, wherein the cloud service identity provider of the customer communicatees with the customer certificate authority in accordance with customer user roles and policies.

13. One or more non-transitory computer-readable media storing computer-executable instructions that, when executed by a computing system, cause the computing system to perform operations for an application access framework in a cloud computing environment, comprising:

authenticating, by a secure login server via a secure login service, a customer user requesting access to a cloud application;

obtaining, by the secure login service, a user access token via an Open Identifier Connect ("OIDC") client at a customer cloud-based Identity Authentication Service ("IAS") tenant, wherein the OIDC client is a clone of a parent OIDC client, at a provider IAS tenant, and inherits access from the parent OIDC client;

arranging for the user access token to be exchanged for an anonymized exchanged access token;

providing the anonymized exchanged access token from the secure login service to a cloud service identity provider executing at a hyperscaler of the customer to gain temporary access;

using, by the secure login service, the temporary access to have a customer Public Key Infrastructure ("PKI") certificate authority in the cloud service issue an authentication certificate for the customer user;

using the authentication certificate to provide the customer user with access to the cloud application; and after use, revoking the user access token and the anonymized exchanged access token.

14. The media of claim 13, wherein the secure login service authenticates the customer user via Single Sign-On ("SSO").

15. The media of claim 13, wherein the cloud application access is part of an integration suite for data, application, and application Programming Interface ("API") integration.

16. The media of claim 13, wherein the cloud application comprises an Advanced Business Application Programming ("ABAP") business application.

* * * * *